United States Patent [19]

Moriarty

[11] Patent Number: 5,184,692
[45] Date of Patent: Feb. 9, 1993

[54] RETRIEVABLE RADIATION SOURCE CARRIER

[75] Inventor: Keith A. Moriarty, Houston, Tex.

[73] Assignee: Schlumberger Technology Corporation, Houston, Tex.

[21] Appl. No.: 670,850

[22] Filed: Mar. 18, 1991

[51] Int. Cl.$^5$ .............................................. E21B 49/00
[52] U.S. Cl. ....................................... 175/50; 250/265; 73/152; 324/356; 346/33 WL
[58] Field of Search ............... 175/50; 73/152; 375/6; 324/356; 340/853; 346/33 WL; 250/265

[56] References Cited

U.S. PATENT DOCUMENTS

| | | | |
|---|---|---|---|
| 3,004,160 | 10/1961 | Tittle | 250/265 |
| 3,112,442 | 11/1963 | Bennett . | |
| 3,186,222 | 6/1965 | Martin . | |
| 3,209,323 | 9/1965 | Grossman . | |
| 3,255,353 | 6/1966 | Scherbatskoy . | |
| 3,855,857 | 12/1974 | Claycomb . | |
| 4,041,780 | 8/1977 | Angehrn . | |
| 4,396,071 | 8/1983 | Stephens | 175/50 |
| 4,520,468 | 5/1985 | Scherbatskoy . | |
| 4,550,392 | 10/1985 | Mumby . | |
| 4,596,926 | 6/1986 | Coope | 250/265 |
| 4,698,501 | 10/1987 | Paske . | |
| 4,705,944 | 11/1987 | Coope . | |
| 4,791,797 | 12/1988 | Paske et al. | 175/50 |
| 4,814,609 | 3/1989 | Wraight et al. . | |
| 4,845,359 | 7/1989 | Wraight . | |
| 4,879,463 | 11/1989 | Wraight et al. . | |

*Primary Examiner*—Ramon S. Britts
*Assistant Examiner*—Roger J. Schoeppel
*Attorney, Agent, or Firm*—John J. Ryberg; Gary L. Bush

[57] ABSTRACT

A retrievable radiation source carrier assembly for a logging while drilling tool is disclosed. The carrier includes a solid rod or member of high strength and low elastic modulus that connects the housings of at least two radiation sources. In a preferred embodiment, the carrier includes a sheath of high performance thermoplastic that covers the rod from the upper source to the lower source. The sheath provides the carrier with a smooth outer surface and a substantially constant diameter that resists the accumulation of mud particulate buildup thereon. The sheath also provides a low friction surface which allows improved ease of insertion and removal of the radiation source carrier into and from the internal source passageway of the LWD tool. In another preferred embodiment, the source carrier's end cap disposed above the upper source is provided with a drilling fluid path that provides drilling fluid pressure equalization between the interior of the LWD tool and the source passageway in which the carrier assembly is placed. The pressure equalization path includes a gravity trap for substantially preventing particulates found in the drilling fluid from entering the source passageway and settling around the source carrier assembly.

10 Claims, 4 Drawing Sheets

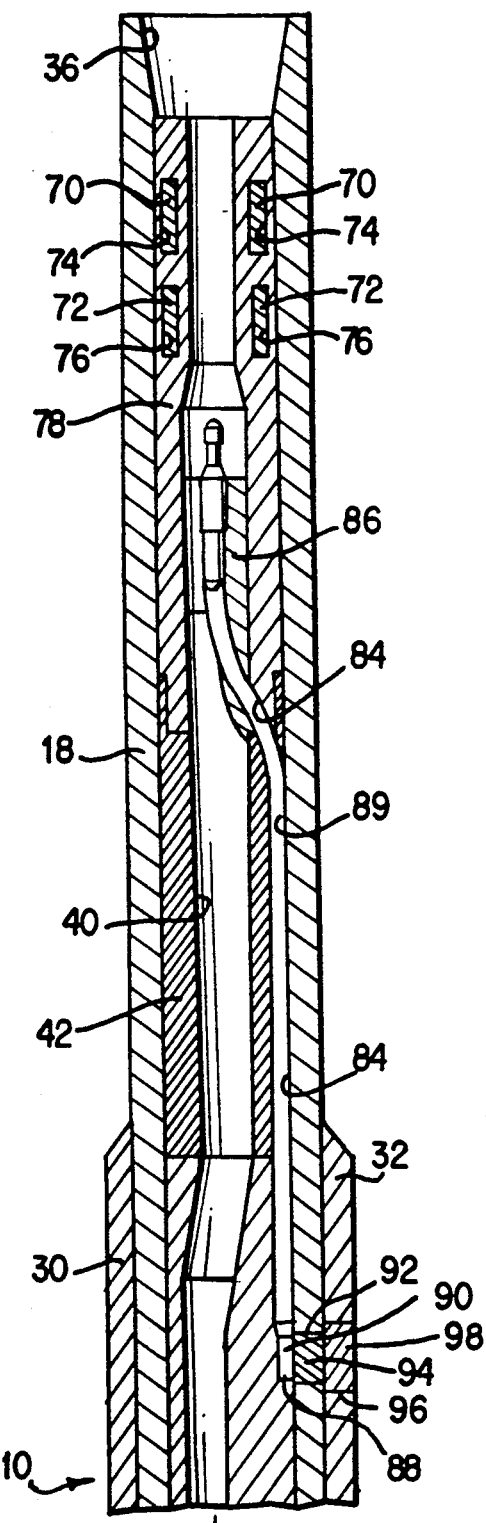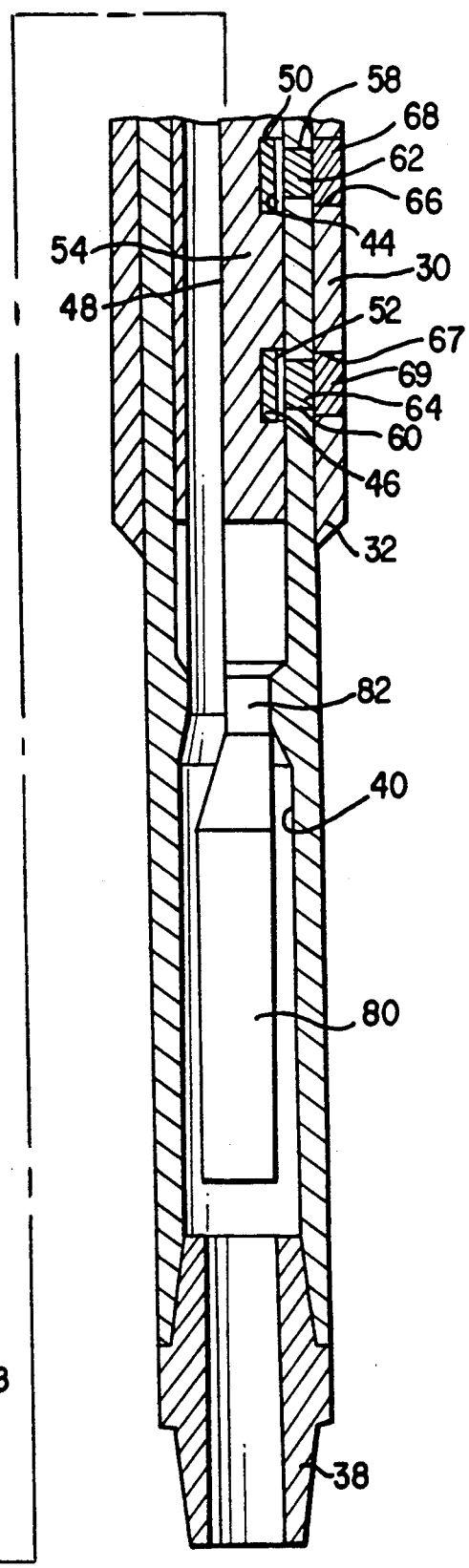
FIG. 2A
PRIOR ART
FIG. 2B
PRIOR ART

RETRIEVABLE RADIATION SOURCE CARRIER

TECHNICAL FIELD

The present invention relates to methods of and apparatus for measuring properties of earth formations based on radiation characteristics. More particularly, the present invention relates to a radiation source carrier that is retrievable downhole from the interior of a logging-while-drilling apparatus.

BACKGROUND OF THE INVENTION

In drilling an oil or gas well, successive measurements are typically made of various borehole conditions and properties of earth formations that are being penetrated by a drill bit as it progressively creates a borehole. In the past, many of these measurements could not be obtained unless the drill string was temporarily removed from the borehole and one or more wireline logging operations were conducted in the open borehole. Since wireline logging operations can significantly prolong the time needed to complete a borehole, the usual practice is to minimize the number of open hole logs that are run during the course of drilling a given borehole.

Different proposals have been made for making one or more of these measurements without having to remove the drill string. For example, U.S. Pat. No. 3,112,442 discloses a self-contained instrument including a suitable power supply, a recorder, and various electrical and/or radioactivity sensors that is adapted to be moved through the longitudinal bore of a drill string and landed on a seat just above the drill bit. Once a series of measurements is taken, a wireline overshot is lowered through the drill string and coupled to a fishing neck on the upper end of the instrument housing for returning the instrument to the surface for analysis of the measurements.

A similar arrangement is shown in U.S. Pat. No. 3,209,323 which transmits recorded measurements to the surface by way of a logging cable carrying an overshot having a winding inductively coupled to a matched winding in a fishing neck on the instrument. Another proposal in U.S. Pat. No. 3,186,222, employs a self-contained measuring assembly having electrical and/or radioactivity sensors that are mounted on the lower end of the drill string just above the bit. With this arrangement, the output signals from the measuring assembly are converted into successive alternately-polarized electromagnetic pulses that are transmitted along the walls of the drill string to surface detectors by means of self-contained repeater stations tandemly coupled at spaced intervals in the drill string. Since the radioactivity logging devices disclosed in the above-cited patents are designed to measure only the natural gamma radiation from the earth formations, such logging devices do not require a source of radioactivity.

Man of the problems associated with various prior systems have been at least partially overcome with various measuring-while-drilling (MWD) or logging-while-drilling (LWD) tools. With the introduction of MWD tools that are now commercially available, it has become practical to transmit to the surface one or more real-time downhole measurements without interrupting the drilling of a borehole. As described, for example, in greater detail in U.S. Pat. No. 3,855,857, the MWD tool disclosed therein can measure downhole conditions such as weight-on-bit, torque acting on the bit, azimuthal direction and angle of inclination of the borehole, borehole pressure and temperature, mud resistivity, and various characteristics of the earth formations penetrated by the bit. The output signals of the various sensors are coupled to circuits that selectively control a downhole acoustic signaler in the tool for successively transmitting encoded data signals representative of these real-time measurements through the mud stream in the drill string to suitable detecting and recording apparatus at the surface.

Several MWD tools have been proposed for providing real-time measurements of different radioactivity characteristics of the earth formations being penetrated by the drill bit. Since measurement of natural gamma radiation requires only a gamma-ray detector and typical circuits to control the signaler, it has not been difficult to provide MWD tools with that instrumentation. Typical MWD tools with this capability are shown, for example, in U.S. Pat. No. 4,520,468 as well as in FIG. 4 of U.S. Pat. No. 3,255,353. On the other hand, as depicted in FIG. 1 of the last-cited patent, to measure other radioactivity characteristics of earth formations, an MWD tool must also have an appropriate source of radiation such as a radioactive chemical source. Since the measurement of formation density is impaired by borehole fluids, as seen, for example, in U.S. Pat. No. 4,596,926, it has been proposed to compensate for the effect of the fluids by arranging an array of radioactive sources and radiation detectors around the tool body.

Another prior attempt at providing nuclear formation evaluation while drilling is disclosed in U.S. Pat. Nos. 4,596,926; 4,698,501; and 4,705,944. In these patents, the disclosed apparatus design places the nuclear source in pockets located on the exterior of a drill collar. Three independent measures are provided for preventing the source from becoming dislodged during the drilling operation. While these measures appear to reduce the risk of losing a source in the well, it is believed that the process of inserting and removing the source into and from the pocket requires a considerable amount of time and effort, which might expose the operators performing the task to a significant amount of radiation. In addition, the amount of time required to remove the source from the tool upon return to the earth's surface can be significantly increased if the drilling process and downhole environment has damaged the exterior of the drill collar and/or the source pocket.

Any time an MWD tool is being used in a drilling operation, it is always possible for the tool to become inadvertently stuck in the borehole. If the tool or drill string becomes firmly stuck, it may be necessary to back-off and retrieve the upper portion of the drill string and then to use one or more "fishing" techniques to recover the remaining portion of the drill string including the MWD tool from the borehole before the drilling operation is resumed. Such fishing operations may, however, subject an MWD tool to severe impacts that might severely damage the tool's inner components. Thus, should an MWD tool carrying a chemical radioactive source become stuck to such an extent that the tool cannot be readily recovered, it is possible that the containment means around the source might rupture in the course of a fishing operation. Should this occur, the borehole fluids could become contaminated, thereby creating a hazard in handling the damaged tool when it is recovered at the surface, or if the borehole fluids are circulated back to the rig and associated surface equipment. In addition, if the source-containing MWD tool cannot be recovered, various expensive environmental protection procedures must be followed. Accordingly, such risks must always be considered when the conditions for a borehole are such that a source-carrying MWD tool might become stuck.

To overcome such problems, various proposals have been made to provide self-contained instruments that can be moved through the drill string and temporarily stationed in one of the drill collars just above the drill bit. For example, as described in U.S Pat. No. 4,041,780, a self-contained logging instrument is arranged to be pumped through the drill string to a landing seat temporarily installed on the lower end of the drill string. However, it is believed that a major disadvantage with this instrument is that the drill bit must be temporarily replaced with the sub carrying the seat when a series of measurements are to be made. Thus, since each series of measurements requires two complete round trips of the entire drill string, ordinarily it will be far more practical to use a wireline logging tool for obtaining these measurements while the drill string is out of the borehole.

U.S. Pat. No. 4,550,392 also describes a similar self-contained instrument that is moved into and out of the drill string by a cable. However, even though this instrument is installed and removed while the drill string and drill bit are in the borehole, because the instrument's sensors are located within a thick-walled drill string, certain formation radioactivity characteristics can not be effectively measured. Moreover, once the instrument has been removed from the drill string, the drilling operation must be continued without the benefit of further downhole measurements.

In commonly-assigned U.S. Pat. Nos. 4,814,609; 4,845,359; and 4,879,463; which are incorporated herein in their entirety by reference, various embodiments of measurement-while-drilling nuclear tools are disclosed that are adapted to be coupled to a drill string to make formation evaluations. One noteable feature of these tools is the provision of a retrievable source carrier that includes one or more radioactive sources and which is cooperatively arranged to be moved through the interior of a drill string to a selected station within the tool's body. The source carrier preferably includes a relatively stiff metal cable joining the radioactive sources. By providing such a source carrier, it is possible to insert or remove the sources into or from the tool while the tool is positioned below the drilling rig floor, which substantially avoids high radiation conditions at the rig floor. In addition, such a source carrier makes it possible to remove the radioactive sources from the tool if the tool were to become stuck within the borehole. A wireline conveyed overshot is used, for example to retrieve the source carrier.

The MWD tool and retrievable source carrier disclosed in these patents are extremely reliable and provide safety measures not found elsewhere. However, it has been found that with the present design of the source passageway and source receptacle area within the tool, solid particles commonly found in the drilling mud can enter the source passageway and receptacle area and become packed around the source carrier. In some cases, these particles can make it somewhat difficult to remove the source carrier from the tool. In addition, it has been found that in some instances the lower source receptacle can become partially filled with particulates found in the drilling mud which prevent the lower source from being properly positioned within the receptacle, which in turn raises the possibility of producing inaccurate formation measurements. The possibility of improper source positioning is further exaggerated by the fact that the cable joining the sources is subject to compressive deformation, i.e. "birdcaging", if solids partially block or settle within the lower receptacle area and prevent the lower source from fully reaching its proper position within the lower source receptacle.

In light of the above, a principle object of the present invention is to provide an LWD apparatus having one or more radiation detectors cooperatively arranged within a tubular body to measure one or more radioactivity characteristics of adjacent earth formations with a retrievable source carrier assembly that can be more easily inserted into or removed from the tubular body in such a manner that personnel on the drilling rig are exposed to as little radiation emitted from the sources as is reasonably possible.

A further object of the present invention is to provide a nuclear LWD apparatus with a retrievable source carrier assembly that can be more easily removed and recovered from the tool during a drilling operation in the event that the drillstring and LWD apparatus become stuck within the well.

Another object of the present invention is to provide a nuclear LWD tool with an internal source passageway and source receptacle area that substantially resist the accumulation of mud-carried particulate buildup in operation.

Another principle object of the present invention is to provide a source carrier assembly for use in a nuclear LWD tool wherein the sources are joined by a solid yet flexible member having a substantially smooth outer surface that substantially resists the accumulation of particulate buildup thereon.

Yet another object of the present invention is to provide a source carrier assembly for use in a nuclear LWD tool wherein the sources are joined by a solid yet flexible member having a high compressive strength that will not deform when subjected to normal compressive loads.

SUMMARY OF THE INVENTION

The radiation source carrier and internal source passageway of the present invention are adapted to be used in conjunction with a nuclear logging-while-drilling (LWD) tool. Briefly, within a representative LWD tool, a first group of detectors sensitive to secondary radiation is positioned within the tool's tubular body at a first spaced location from a neutron radiation source and produces a signal indicative of the detected secondary radiation. In this regard, the term "secondary radiation" is used to include either neutrons scattered by the formation (e.g. thermal or epithermal neutrons) or gamma rays resulting from neutron capture by nuclei of the formation. A second similar set of detectors is positioned at a second spaced location in order to permit the well known technique of borehole compensation. Such first and second sets of detectors may include thermal or epithermal neutron detectors, (e.g. gas tubes of the Helium 3 or Boron trifluoride category or scintillator/photomultiplier combinations using plastic scintillators or lithium glass based scintillators) or gamma ray detectors, (e.g. G.M. tubes or scintillator/photomultiplier combinations of the sodium iodide or cesium iodide scintillator category). Each set of detectors may be arranged in a circular array with an interior central cylindrical thermal neutron shield which allows the downward flow of drilling fluid through the center of the array. The array may comprise at least two different kinds of detectors in order to maximize the information obtainable. As an example, where the two types of detectors are GM tubes (which detect capture gamma rays) and He 3 detectors (which detect scattered neutrons), signals from both sets of detectors may be combined to generate an indication of chlorine in the formation.

The exemplary LWD apparatus also includes a gamma ray source positioned against the interior side of the tubular body at an axial position different from the position of the neutron source. First and second gamma ray detector systems, either scintillation crystals coupled to photomultiplier tubes or GM tubes, are positioned at different spacings from the gamma ray source. These detectors are preferably eccentered against the side of the interior passage of the tubular body. Since the gamma ray source and detectors are on the interior of the tubular body of the tool, gamma ray backshielding may be provided behind the detectors while gamma ray transparent windows are provided through the body to permit the exit and return of the gamma rays. A fluid excluding means such as a stabilizer having blades may be externally positioned adjacent the positions of the windows and may also be provided with similar windows. In this manner the source and detector are collimated so as to significantly enhance vertical and circumferential resolution as the drill collar rotates during the drilling process. Means may then be provided for generating a signal as a function of angular position by detecting such rotational position and recording the detected data accordingly.

In the LWD nuclear logging apparatus, both neutron and gamma ray nuclear sources are located within the interior of a cylindrical drill collar and are cooperatively arranged such that sources may be axially inserted into and withdrawn from one end of the collar. The neutron and gamma ray sources are contained within a retrievable source carrier of the present invention that preferably includes a grappling or fishing head on its uppermost flexible rod made of a material having high strength and a low elastic modulus such as titanium or beryllium copper. In a preferred embodiment, the solid rod is encased within a sheath made of high performance thermoplastic such as polyetheretherketone (PEEK) or polyethersulphone (PES). The sheath provides the source carrier with a substantially constant diameter between the source housings as well as a smooth outer surface which substantially resists the accumulation of particulates found in the drilling fluid around the source carrier. In addition, the outer sheath provides the source carrier with a low friction outer surface which makes it substantially easier to insert and withdraw the carrier into and from the tool's internal source passageway.

In a preferred embodiment of the present invention, the tool's internal source passageway is in fluid communication with the high pressure mud within the collar for pressure equalization purposes. The upper portion or end cap of the source carrier and the upper portion of the tool's internal source passageway are cooperatively arranged to allow a small portion of the drilling mud to enter the source passageway through upwardly-directed channels. By requiring the drilling mud to move upwardly in this fashion in order to enter the source passageway, gravitational forces substantially prevent solid particulates in the drilling fluid from entering the source passageway, and settling and becoming packed around the retrievable source carrier, which otherwise would make it more difficult to insert and properly position the sources carrier within the source passageway, and also make it more difficult to withdraw the source carrier from the passageway.

BRIEF DESCRIPTION OF THE DRAWINGS

The novel features of the present invention are set forth with particularity in the appended claims. The invention, along with further objects and advantages thereof, will be better understood from the following detailed description of an exemplary embodiment with reference to the accompanying drawings in which:

FIGS. 2A and 2B are cross-sectional views of the prior art LWD apparatus shown in FIG. 1 with FIG. 2B forming a lower continuation of FIG. 2A;

DETAILED DESCRIPTION OF THE INVENTION

Figure 1:
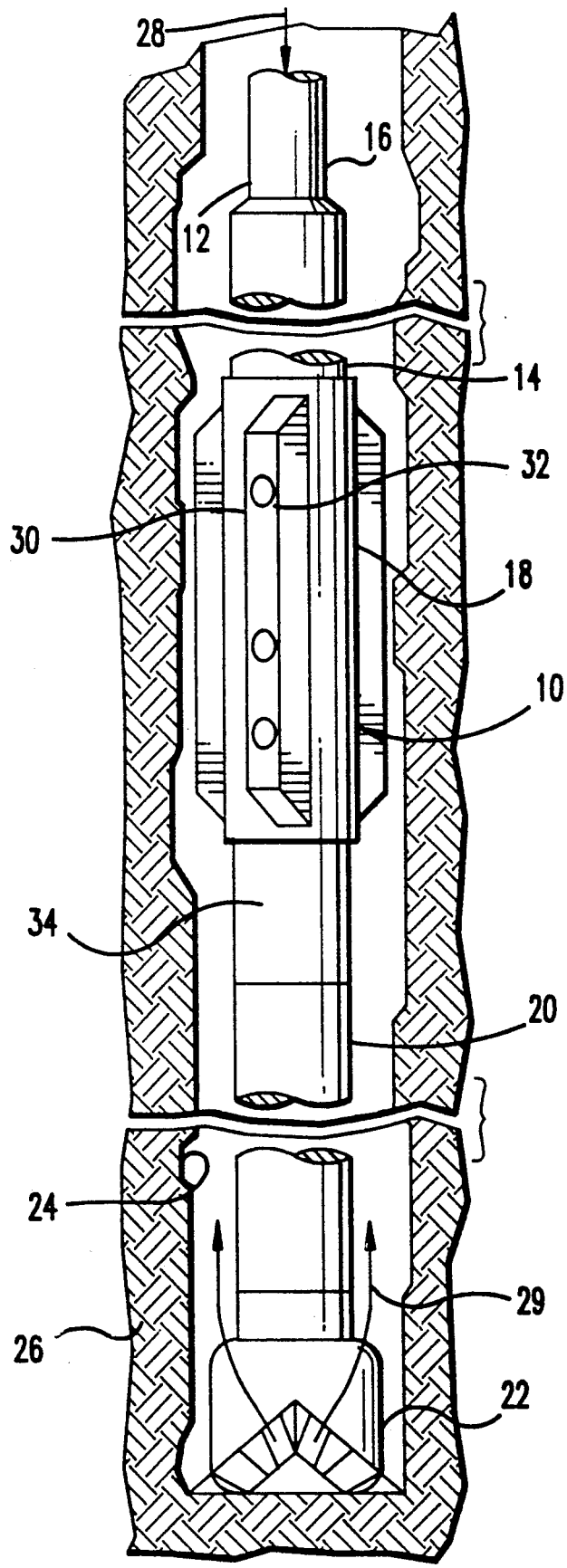
FIG. 1 is a side schematic view of a prior art LWD apparatus shown incorporated into a drill string in which the retrievable source carrier and internal source passageway of the present invention are particularly adapted to be used.

Turning now to the Figures in which like numerals indicate common component and environment elements, FIGS. 1, 2A, and 2B schematically illustrate a prior art LWD apparatus generally indicated as 10 in which the retrievable source carrier and source passageway of the present invention are particularly adapted to be used. Accordingly, it is believed to be advantageous to first briefly describe LWD apparatus 10 followed by a more detailed description of the present invention.

In FIG. 1, apparatus 10 is shown dependently coupled to the lower end of drill string 12 having one or more drill collars 14 and a plurality of tandemly-connected drill pipe joints 16. LWD apparatus 10 includes an outer tubular body 18 that is coupled to the upper end of MWD tool 20 which in turn is coupled to earth-boring means such as a fluid-powered turbodrill or a drill bit 22 for progressively forming a borehole 24 through various subterranean earth formations 26. As is customary, drill string 12 is rotated by a drilling rig (not shown) located at the earth's surface while substantial volumes of "drilling mud" are pumped downwardly through the interior of drill string 12 as shown by flow arrow 28. The drilling mud is discharged from multiple ports in drill bit 22 to lubricate and cool the bit as well as to transport formation materials removed by the bit to the surface as the drilling mud is returned upwardly as shown by flow arrows 29 via the annular space between borehole 24 and the exterior of drill string 12.

LWD apparatus 10 further preferably includes enlarged portion 30 cooperatively arranged on outer tubular body 18 so as to project outwardly toward borehole 24. Enlarged portion 30 preferably takes the form of a drill collar stabilizer, either undergage or full gage, with one or more generally-helical or straight blades 32 which are preferably constructed of steel or other type of gamma-ray shielding material. Stabilizer 30 preferably includes a split body that allows it to be positioned on and clamped around tubular body 18.

Still referring to FIG. 1, MWD tool 20 preferably includes an assembly of thick-walled tubular bodies enclosing sensors and circuits (not shown) for measuring various downhole conditions as well as selected properties or characteristics of the formations 26 that have been penetrated by drill bit 22. Although other means can, of course, be employed to transmit the measurements to the surface, the depicted MWD tool 20 preferably further includes an acoustic data-signaling means 34 arranged for receiving output signals from the several measuring sensors and successively transmitting encoded signals representative of these output signals through the drilling mud in drill string 12 to the surface where the acoustic signals are detected and processed by appropriate signal detecting-and-processing surface apparatus (not illustrated). MWD tool 20 and data-signaling means 34 as well as the surface apparatus are preferably arranged in a similar fashion as the downhole and surface apparatus that are disclosed in U.S. Pat. Nos. 4,637,479 or 4,479,564, which in addition to the references cited therein are each hereby incorporated herein by reference.

Turning now to FIGS. 2A and 2B, successive elevational views in cross-section are shown of LWD apparatus 10. As depicted, outer tubular body 18 includes typical box and pin tool joints 36 and 38 arranged at each respective end for coupling LWD apparatus 10 between the lower end of the drill string 12 and the upper end of MWD tool 20. Longitudinal bore 40 is provided through tubular body 18 and sized for accommodating the flow of drilling mud from drill string 12 to drill bit 22. An elongated cylindrical body 42 is coaxially disposed in the mid-portion of longitudinal bore 40 and fluidly sealed therein in relation to outer tubular body 18.

Referring to FIG. 2B, to facilitate measuring formation density by LWD tool 10, gamma-radiation detectors 44 and 46 are enclosed in an elongated fluid-tight chamber 48 that is arranged within the tubular body 18 to one side of longitudinal bore 40. Detectors 44 and 46 can be, for example, inorganic scintillators coupled to a photomultiplier. To position detectors 44 and 46 at appropriate longitudinally-spaced intervals within fluid-tight chamber 48, the detectors are respectively mounted in separate upper and lower recesses 50 and 52 formed in radiation shield 54 that is cooperatively arranged within chamber 48 and positioned so that the recesses face outwardly toward tubular body 18. As is typical with gamma-radiation detectors, radiation shield 54 is constructed of one or more suitable gamma-ray shielding materials such as bismuth, lead, a tungsten alloy, or other materials that are substantially opaque to gamma-ray energy.

Since tubular body 18 would normally substantially limit or prevent gamma-ray energy from reaching detectors 44 and 46, upper and lower lateral openings 58 and 60 are formed in tubular body 18 and respectively aligned with the gamma-ray sensitive elements of upper and lower detectors 44 and 46 within chamber 48. Openings 58 and 60 are fluidly sealed by radiation-transparent members or windows 62 and 64, respectively, that are preferably hollow titanium inserts, or inserts constructed of a radiation-transparent material such as beryllium or nitrile rubber that are each protected from the borehole fluids by a thin titanium sheath. To minimize the adverse effects of the mud standoff, LWD apparatus 10 further includes upper and lower openings 66 and 67 which appropriately extend through blade 32 of modified stabilizer 30 so that whenever stabilizer 30 is properly mounted on tubular body 18, openings 66 and 67 in blade 32 are laterally aligned with their associated openings 58 and 60 through tubular body 18. To exclude mudcake or other borehole materials from plugging openings 66 and 67 in blade 32, the openings in each modified blade 32 are also respectively filled with plugs or windows 68 and 69 of rubber, epoxy, or other type of radiation-transparent material.

In addition to obtaining measurements representing the density of various earth formations being penetrated during a drilling operation, it is also preferred to obtain contemporaneous measurements representing the neutron porosity of those formations. Accordingly, as depicted in FIG. 2A, LWD apparatus 10 further includes one or more radiation detectors 70 and 72 cooperatively arranged within outer tubular body 18. Detectors 70 and 72 are preferably mounted within upper and lower enclosed spaces 74 and 76 within elongated tubular extension 78 coaxially arranged within longitudinal bore 40 and fluidly sealed relative to outer tubular body 18. In a particularly preferred embodiment, a plurality of detectors 70 and 72 are circumferentially spaced within elongated tubular extension 78 as shown in FIG. 3B of commonly-assigned U.S. Pat. No. 4,879,463, which again is hereby incorporated herein by reference. Detectors 70 and 72 may be, for example, He-3 or Geiger-Mueller detectors.

As shown in FIG. 2B, in a preferred embodiment of LWD apparatus 10, at least a portion of the electronic circuitry is arranged within fluid-tight chamber or cartridge 80 that is mounted within longitudinal bore 40 below detector chamber 48 and coupled thereto by tubular extension 82 which provides a conductor passage between cartridge 80 and the various detectors thereabove. Cartridge 80 may contain suitable memory capabilities and a power supply for downhole information recording operations independent of the real time mud pulse telemetry system associated with MWD tool 20.

Referring again to FIG. 2A, in the preferred embodiment of LWD apparatus 10, the upper and middle portions of cylindrical body 42 are cooperatively arranged in defining an upwardly-opening blind bore or radiation source passageway 84 that extends from centralizing member 86 downwardly to lower source receptacle 88. Lower source receptacle 88 is preferably located on the same side of outer tubular body 18 as detectors 44 and 46 and located a short distance thereabove. In the operation of LWD tool 10, radiation source passageway 84 contains retrievable source carrier assembly generally indicated as 89. An improved retrievable source carrier assembly of the present invention is shown and described later herein.

Lower source receptacle 88 is preferably laterally offset in relation to longitudinal bore 40 and cooperatively arranged with cylindrical body 42 so as to define a reduced-thickness wall portion 90. Since outer tubular body 18 would substantially attenuate the passage of gamma-ray energy emitted from a source contained within receptacle 88, lateral aperture 92 is provided through outer tubular body 18 on the outer side of reduced-thickness wall portion 90 and arranged such that it is horizontally aligned with source receptacle 88. Lateral aperture 92 is fluidly sealed with substantially radiation-transparent plug or window 94 similar or identical to earlier-described windows 62 and 64 located adjacent to detectors 44 and 46. Similarly, lateral aperture 96 is provided through blade 32 of stabilizer 30 and aligned with source receptacle 88 in order to minimize the attenuation of gamma-ray energy. Lateral aperture 96 is preferably filled with a radiation transparent material 98 for excluding mudcake and other borehole materials and fluids.

A primary function of modified stabilizer 30 is to maximize radiation streaming from a gamma ray source placed within lower source receptacle 88 through earth formations 26 to detectors 44 and 46. In addition, blades 32 of stabilizer 30 serve to effectively displace or exclude drilling mud from the portion of the borehole annulus between detectors 44 and 46 and the adjacent earth formation 26.

Figure 3A:
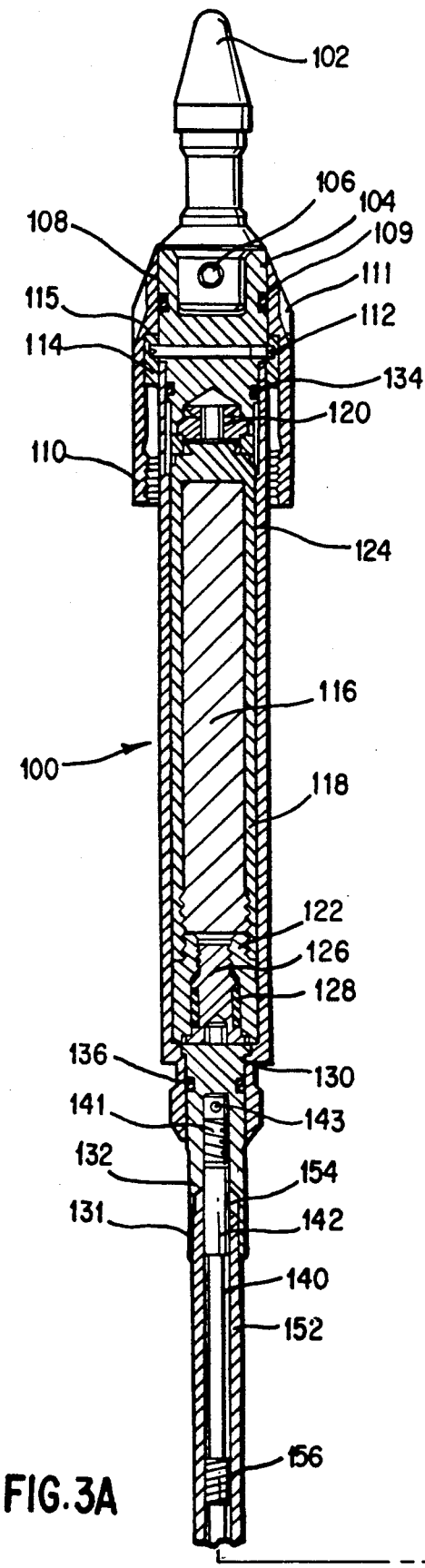
FIGS. 3A and 3B are enlarged cross-sectional views of a retrievable source carrier assembly of the present invention with FIG. 3B forming a lower continuation of FIG. 3A.
Figure 3B:
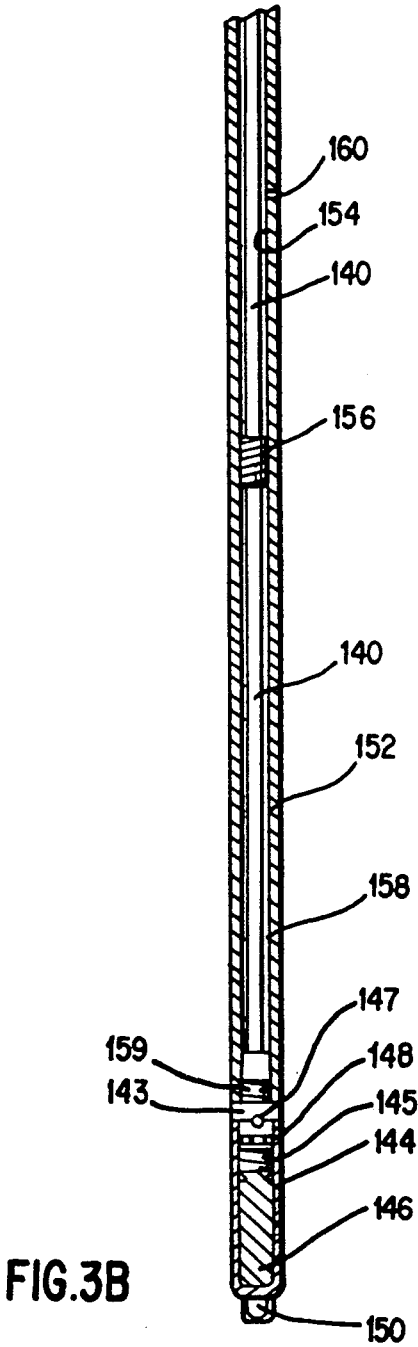

In keeping with the objects of the present invention, LWD apparatus 10 is provided with an improved retrievable radiation source carrier assembly generally indicated as 100 which is shown in detail in FIGS. 3A and 3B. In FIG. 3A, the upper end of retrievable radiation source assembly 100 is provided with upstanding fishing head 102 that is connected to adapter 104 with pin 106. Downwardly-projecting cup-shaped end cap 108 surrounds adapter 104 and is fluidly-sealed in relation thereto with O-ring 109. The inner surface of lower end or skirt 110 of end cap 108 is provided with threads for releasably engaging end cap 108 to corresponding threads on the outer surface of centralizing member 86 (FIG. 2A) when source carrier 100 is inserted into source passageway 84 of LWD tool 10. A plurality of vertical slots or grooves 111 is provided on the upper outer surface of end cap 108 to provide a suitable place for engaging end cap 108 with a wrench to torque source carrier 100 in place.

Shear pin 112 laterally passes through a bore in adapter 104 and terminates at each end within shear ring 114 located below shoulder 115 of end cap 108. Neutron radiation source 116 is housed within source casing 118 which is secured by the lower end of adapter 104 and retaining nut 120 at its upper end and terminates with end plug 122 at its lower end. Source 116, casing 118, and end plug 122 are contained within source outer housing 124. Wipe test access plug 126, which is provided with seals 128 on the outer periphery thereof, is engaged within end plug 122 to allow access for conducting wipe tests as needed.

Upper adapter bushing 130 having lower skirt 131 and shoulder 132 is partially contained within housing 124 and positioned by end plug 122 and source casing 118. The upper and lower ends of source outer housing 124 are preferably fluidly sealed by adapter 104 and its associated o-ring 134, and upper adapter bushing 130 and its associated o-ring 136.

Referring now to FIG. 3B in conjunction with FIG. 3A, elongated solid rod 140 having integral enlarged head 142 at its upper end is attached to upper adapter bushing 130 with screw threads 141. Locking pin 143 is provided to secure solid rod 140 to bushing 130. Rod 140 is preferably made of a high yield strength, low elastic modulus material that is able to withstand hostile and corrosive environments. Such a suitable material is titanium sold under the name Beta-C, which is available from RMI Titanium of Niles, Ohio USA, or beryllium copper.

Gamma-ray source housing 144 encasing gamma ray source 146, which is preferably cobalt or cesium or any other radioactive substance that produces gamma rays in its decay, is threadedly attached to integral enlarged tail 143 of rod 140 by screw threads 145 and locked in place with locking screw 147. Source housing 144 is preferably sealed with O-ring 148. Wrench extension 150 projects downwardly from source housing 144 and is shaped and sized complementary to a tool to cooperatively provide a means for removing housing 144 from rod 140.

Returning briefly to FIG. 2A, it has been found that the measurements provided by neutron detectors 70 and 72 are enhanced if neutron radiation source 116 is substantially coaxially arranged within tubular body 18 of LWD tool 10. It has also been found that the measurements provided by gamma ray detectors 44 and 46 are enhanced if gamma ray source 146 is positioned against the interior side of tubular body 18. Accordingly, source passageway 84 follows a curved route from centralizing member 86 down to lower source receptacle 88. Because of this, solid rod 140 must be flexible enough to bend and readily conform to the curved configuration of source passageway 84 to ensure proper source location and positioning of neutron source 116 and gamma ray source 146 and yet have sufficient tensile strength to survive a fishing operation. It has been found that a titanium rod having a diameter of from about 0.19 inches (4.8 mm) to about 0.31 inches (7.9 mm) and most preferably 0.19 inches (4.8 mm) will achieve these objectives.

In the preferred embodiment of source carrier 100, lower gamma-ray source housing 144 is on the order of 0.50 inches (12.7 mm) in diameter, which when mated with solid rod 140 would otherwise result in a large shoulder where housing 144 is attached to rod 140. Such a shoulder would provide an area for solid particulates in the drilling mud and other objects to settle, accumulate, and become packed over time above source housing 144, which would render removing retrievable source assembly 100 from source passageway 84 extremely difficult. For this reason, outer sheath 152 is provided around rod 140 from above integral tail 143 of rod 140 all the way up into lower skirt 131 of upper adapter bushing 130 with preferably a small expansion gap 154 provided between the top of sheath 152 and shoulder 132 of bushing 130. Such a gap allows for differences in thermal expansion between sheath 152 and rod 140. Sheath 152, which is preferably an extruded hollow tube of a high performance thermoplastic such as polyetheretherketone (PEEK) or polyethersulphone (PES), therefore provides source carrier 100 with a continuous diameter from just below upper adapter bushing 130 all the way down to lower source housing 144. In addition, sheath 152 provides source carrier 100 with a smooth surface which substantially resists the accumulation of mud-carried particulate buildup thereon, as well as a low friction outer surface which makes it easier to insert carrier 100 into source passageway 84 and withdraw it therefrom.

To provide easy assembly, the inner diameter of sheath 152 is approximately the same as the outer diameter of integral enlarged head 142 of rod 140. However, after rod 140 is inserted into sheath 152, a gap 154 results between the outer surface of rod 140 and the inner surface of sheath 152. Accordingly, solid rod 140 is preferably centralized within sheath 152 with a plurality of centralizers 156 made of, for example, lengths of glass tape wound around rod 140. A lower portion of the resultant gap 154 between sheath 152 and rod 140 and below lower centralizer 156' and above enlarged tail 143 is preferably filled with epoxy 158 to secure sheath 152 to solid 140. Such epoxy 158 is, for example, Emerson & Cumming Uniset G-757. In addition, sheath 152 is preferably threadedly secured to solid rod 140 at enlarged tail 143 by mean of screw threads 159. The remaining gap between solid rod 140 and sheath 152 above lower centralizer 156' is empty. Accordingly, sheath 152 is preferably provided with at least one vent hole 160 which in operation allows high pressure drilling fluid within source passageway 84 to enter gap 154 and provide pressure equalization across sheath 152, which would otherwise be crushed by the fluid.

Thus, in operation and in accord with the objects of the present invention, removal of radiation source carrier assembly 100 of the present invention from LWD tool 10 should tool 10 become stuck in a borehole can be selectively accomplished by lowering a suitable wireline-conveyed overshot (not shown) through the drill string 12 and on into the upper end of tubular body 14 until the overshot is securely coupled to upstanding fishing neck 102. The wireline overshot is then pulled upward until shear pin 112 is sheared off by shear ring 114, thereby leaving end cap 108 engaged to centralizing member 86, and allowing the remainder of retrievable source carrier 100 including the sources to be removed from tool 10 and recovered at the surface. Removal of radiation source carrier 100 will, of course, be carried out without it being necessary to disconnect any electrical connections. Moreover, even though the removal of the sources 116 and 146 will render the radioactivity-logging means of LWD tool 10 thereafter inoperative, other portions of LWD tool 10 and MWD tool 20 will still be functional so that they can continue to provide the other downhole measurements that are independent of radiation sources 116 and 146.

Thus, in keeping with certain objects of the invention, so long as the radiation sources 116 and 146 are positioned within the LWD apparatus 10 of the invention, the radioactivity-logging means 10 will be operative to provide successive signals representative of the formation density and porosity of the earth formations 26 that have been penetrated by the drill bit 22. On the other hand, if the LWD apparatus or lower portion of the drill string 12 were to become stuck in a borehole interval, the source carrier assembly 100 can be readily removed from the apparatus 10 and returned to the surface as a safety precaution before any attempt is made to recover LWD tool 10. In a similar fashion, through the retrievable source carrier assembly 100 will generally be left in position within the LWD tool 10 during the course of a drilling operation, it will be a relatively straightforward matter to remove the assembly 100 from the LWD apparatus 10 as a precautionary matter should it be believed that the drill bit 22 is about to drill into a formation interval in which there is a risk that the LWD apparatus 10 or the downhole tools may become stuck. Once the radioactive sources 116 and 146 have been safely returned to the surface, drilling of the borehole 24 may, of course, be resumed while continuing to operate the MWD tool 20 for measuring the other downhole conditions which do not require potentially-dangerous chemical radioactive sources.

Figure 4A:
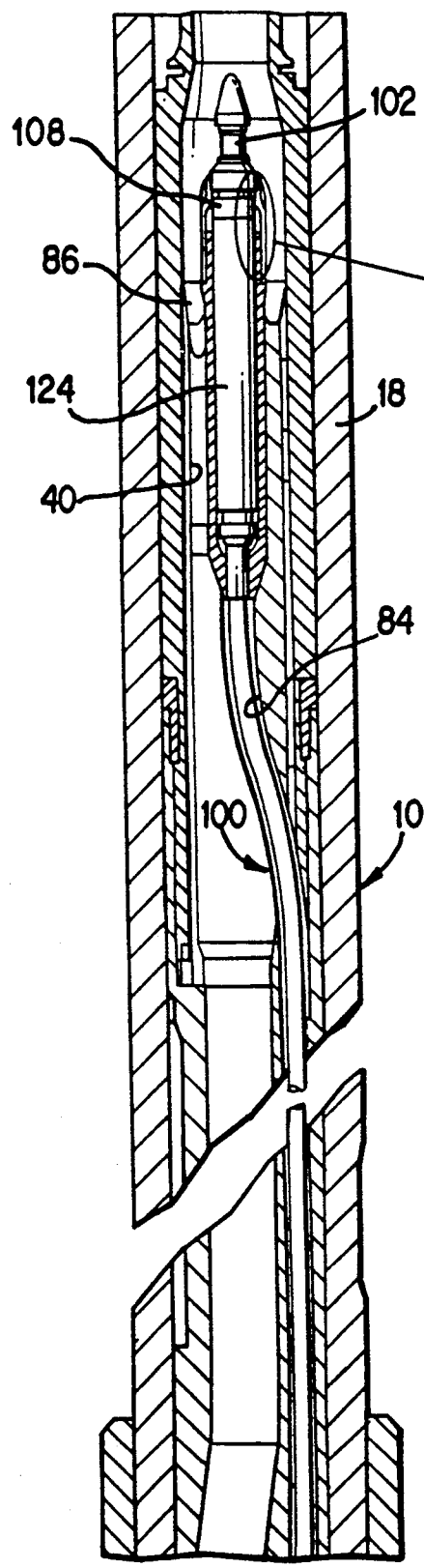
FIG. 4A is a cross-section of the source carrier assembly of the present invention placed within the centralized portion of the downwardly-extending source passageway.
Figure 4B:
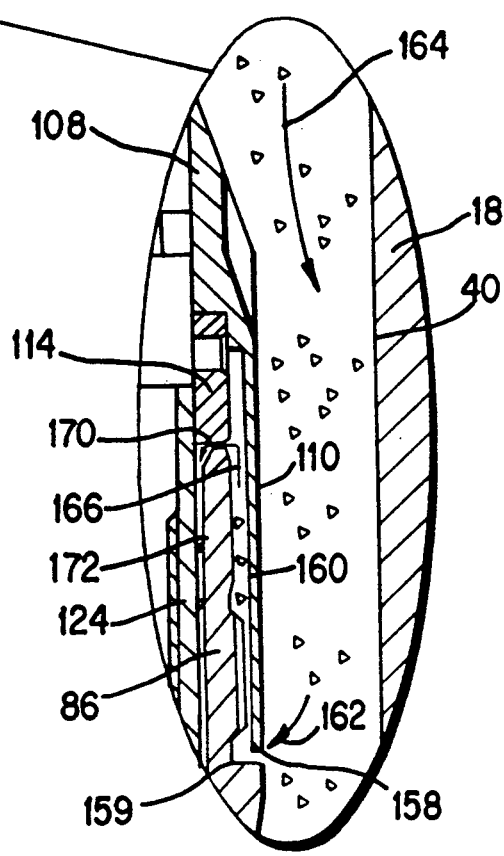
FIG. 4B is an enlarged cross-section of a portion of the end cap of the carrier assembly and a portion of the upper area of the source passageway of FIG. 4A.

Another improvement of the source carrier assembly 100 to that of the prior art source carrier assembly 89 of FIG. 2A is illustrated in FIGS. 4A and 4B. FIG. 4A illustrates the improved source carrier assembly 100 of the present invention placed within centralizing member 86 and source passageway 84 of LWD tool 10. In the prior art embodiment of the source carrier assembly 89, a small hole was provided near the top of the end cap such that a path was provided for a small amount of the drilling fluid to enter source passageway 84 and provide pressure equalization between longitudinal bore 40 and source passageway 84. In practice, it has been discovered that particulates found within the drilling fluid passed into source passageway 84 and created the problems as discussed in the Background Section above.

To solve those problems, a modified end cap 108 as illustrated in greater detail in FIG. 4B provides a structure that inhibits particulate entry into passageway 84 while providing a path for drilling fluid pressure equalization between longitudinal bore 40 and source passageway 84. FIG. 4B is an enlarged cross-section of a portion of end cap 108 with its downwardly extending skirt 110 having female threads adapted to engage the male threads on the outer surface of upwardly extending centralizing member 86. A small gap 158 is provided between the lowermost edge of skirt 110 and an annular shoulder 159 of centralizing member 86. One or more vertical channels or slots 160 are provided within the threads of skirt 110 of end cap 108 and the threads of member 86 such that a small portion of drilling fluid as indicated by arrows 162 of overall mud flow 164 can pass through gap 158 and upwardly through channel 160. From there, the small amount of drilling fluid as indicated by arrow 166 passes through gap 170 between shear ring 114 and centralizing member 86, and from there downwardly into annular space 172 between source outer housing 124 and passageway 84. Annular space 172 continues downwardly throughout source passageway 84 including lower source receptacle 88.

Accordingly, the drilling fluid channeling or trap arrangement as described above for pressure equalization purposes between longitudinal bore 40 and source passageway 84 substantially prevents, by gravity, particulates found in the drilling fluid from entering source passageway 84.

While only a single embodiment of the present invention and one mode of practicing the invention have been illustrated and described herein, it is apparent that various changes and modifications may be made without departing from the principles of the present invention in its broader aspects; and, therefore, the aim in the appended claims is to cover all such changes and modifications as fall within the true spirit and scope of this invention.

What is claimed is:

1. A logging while drilling tool including a radiation source carrier assembly inserted lengthwise therein, said assembly further comprising:
   a) upper and lower nuclear radiation sources contained within respective upper and lower radiation source housings; and
   b) a substantially rigid rod distinct from said tool interconnected between said upper nuclear radiation source housing and said lower nuclear radiation source housing.

2. The assembly of claim 1 wherein said substantially rigid rod is made from a material selected from the group consisting of titanium and baryllium copper.

3. The assembly of claim 1 further comprising an outer sheath of thermoplastic material surrounding said substantially rigid rod.

4. The assembly of claim 3 wherein the inner diameter of said outer sheath is larger than the outer diameter of said rod thereby resulting in a gap therebetween, and wherein said sheath includes means for allowing fluid to enter said gap, thereby providing hyrostatic pressure equalization between the inside and outside of said sheath.

5. The assembly of claim 4 wherein said hydrostatic pressure equalization means comprises at least one vent hole through said sheath.

6. The assembly of claim 4 further comprising at least one centralizer within said gap.

7. The assembly of claim 3 further comprising an upper adapter bushing disposed beneath said upper nuclear radiation source housing and wherein the upper end of said rod is attached to said bushing, said bushing including means for receiving the upper end of the said sheath and for allowing said sheath to move axially with respect to said rod due to differences in thermal expansion between said rod and said sheath.

8. The assembly of claim 7 wherein said lower end of said sheath terminates adjacent to said lower nuclear radiation source housing to provide a continuous outer transition surface from the outer diameter of said lower nuclear radiation source housing to the outer diameter of said upper adapter bushing.

9. A radiation source carrier assembly adapted for use in a logging while drilling tool, said tool including a tubular body and an internal radiation source passageway, the interior of said tubular body containing drilling fluid in normal operation, said assembly comprising:
a) upper and lower nuclear radiation sources contained within respective upper and lower radiation source housings;
b) means flexibly connecting said upper radiation source housing to said lower radiation source housing; and
c) an upper end cap assembly disposed above said upper radiation source housing and attached thereto, said end cap including means for establishing fluid pressure equalization between the interior of said internal radiation source passageway and the interior of said tubular body, said pressure equalization means including trap means for substantially preventing particulates in said drilling fluid from entering said internal radiation source passageway.

10. The radiation source carrier assembly recited in claim 9 wherein said trap means comprises at least one vertical channel on the inner surface of said end cap.

* * * * *